Nov. 19, 1968     G. KESSLER     3,411,254

PLASTIC THERMO-BREAK FOR HEAT CONDUCTIVE ELEMENTS

Filed May 24, 1966

INVENTOR
Gerald Kessler

BY *Max L. Libman*

ATTORNEY

United States Patent Office 3,411,254
Patented Nov. 19, 1968

3,411,254
PLASTIC THERMO-BREAK FOR HEAT
CONDUCTIVE ELEMENTS
Gerald Kessler, 388 Cranberry Road,
Youngstown, Ohio 44512
Filed May 24, 1966, Ser. No. 552,615
6 Claims. (Cl. 52—309)

ABSTRACT OF THE DISCLOSURE

A plastic locking strip is provided which rigidly holds two spaced metal units by extending into recesses formed in the units and also serves to block the transfer of heat between the metal units. The plastic strip contains a heat-actuated blowing agent, and after initial assembly the assembly is heated to expand the plastic into tight and rigid engagement with the two metal members to form a rigid assembled unit including thermal barrier.

---

This invention relates to a plastic thermo-break for heat conductive elements, and more specifically to an extruded plastic locking strip for mechanically joining two metal elements into a relatively rigid structure, while providing at the same time thermal insulation between them to reduce heat transfer between the elements.

One common situation in which the problem arises is in the manufacture and construction of aluminum windows wherein the window main frame is made in two sections—an inner and an outer one. The two sections are then joined by a plastic extrusion which serves both to lock them together mechanically and provides a thermal break which lowers the rate of heat transmission from the warm interior to the cold exterior and also serves to reduce condensation on the interior of the window frame. In present practice, after the plastic strip is inserted to lock the two sections of the window, the window is put through a normal paint line, which includes a run through a heating oven. This subjects the plastic to sufficient heat to cause most plastics of the type used for this purpose to shrink and thus ruin the bond between the plastic and the aluminum, causing a high rejection rate. The same problem can occur in any situation where two metal pieces are bonded with a heat-insulating plastic member.

It is a major object of the present invention to eliminate the above shrinkage problem, while improving the bond between the plastic and the metal or other heat-conductive members which it is uniting. This is accomplished according to the invention by adding a commercially available blowing agent, and extruding or otherwise forming the plastic at a temperature low enough to prevent this blowing agent from being effective to any substantial degree. The plastic element, in the case of aluminum windows, is then inserted into the aluminum frame to unite the two sections, and the plastic is heated in the paint line to a temperature sufficient to cause blowing and consequent expansion of the plastic element. Only enough blowing agent is added to preferably somewhat more than offset the normal tendency to shrinkage, so that there is a resultant slight expansion of the element, to the limit of the confining aluminum surface, which produces a very effective bonding action between the plastic and the aluminum elements to maintain a tight and solid connection between the inner and outer halves of the window. Similarly, a plastic element to which a blowing agent has been added can be used to provide a rigid and effective thermal break between the handle and any implement which is subjected to considerable heat, as in the case of a cooking pan, and so forth.

Figure 1:
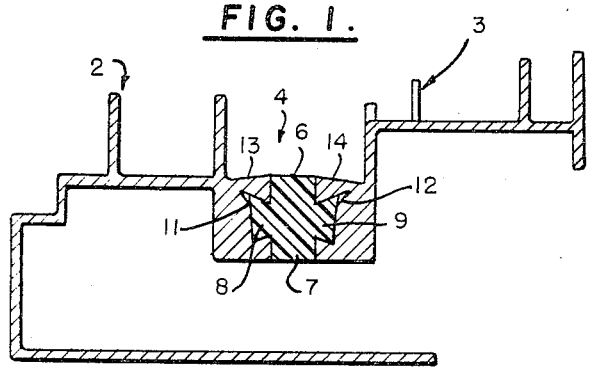
Figure 2:
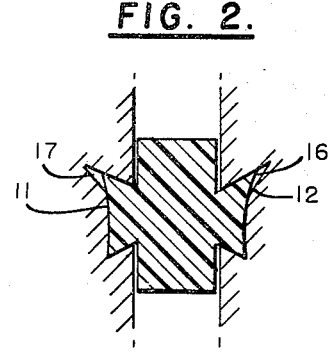
Figure 3:
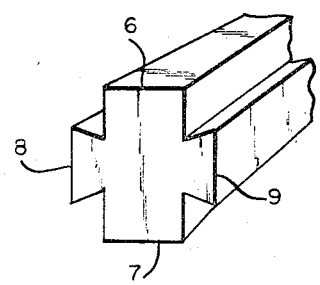
Figure 4:
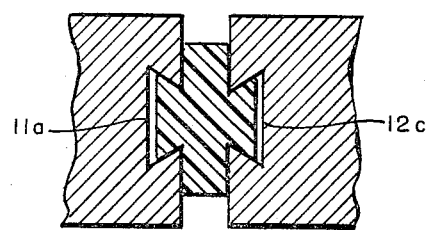
Figure 5:
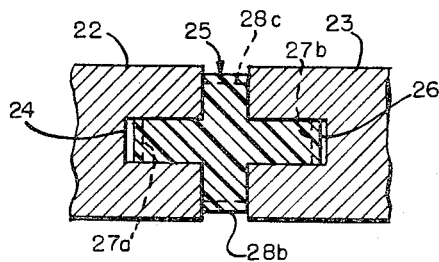
Figure 6:
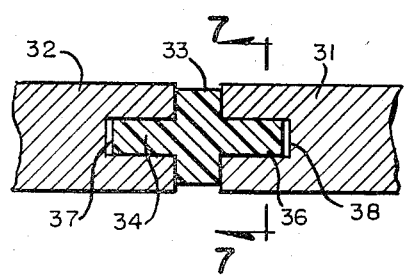
Figure 7:
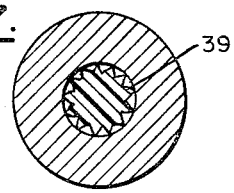

The specific nature of the invention, as well as other objects and advantages thereof, will clearly appear from a description of a preferred embodiment, as shown in the accompanying drawing, in which:

FIG. 1 is a sectional view through a portion of a window frame embodying the invention;
FIG. 2 is a similar enlarged sectional view of the plastic bonding and insulating strip;
FIG. 3 is a perspective view of a section of extruded plastic strip used in the invention;
FIG. 4 is a sectional view showing a thermo-break of slightly different construction;
FIG. 5 is a sectional transview of still another form of extruded plastic thermo-break;
FIG. 6 is a schematic view showing the invention applied to securing an insulated handle for a hot utensil; and
FIG. 7 is a sectional view taken on line 7—7 of FIG. 6.

Referring to FIG. 1, a conventional or known type of aluminum window frame is depicted as being made in two sections 2 and 3, which are joined by a plastic bonding and thermal insulating element 4. The plastic strip 4 has two vertical extensions 6 and 7 which are made sufficiently thick to provide the desired insulation, and horizontal extensions 8 and 9, which are arranged to fit into slots 11 and 12 of the respective sections of the window frame in dove-tail fashion so as to provide firm locking engagement between the sections 2 and 3. The assembly is made in any desired fashion, as by sliding a plastic strip 4 longitudinally from one end into the locking engagement shown. Preferably, however, flanges 13 and 14 may be initially bent up from the position shown in order to permit lateral insertion of the strip 4, after which the flanges 13 and 14 are bent down in order to lock the sealing strip into place. However, the above method of assembly is not a part of the present invention.

It has been found that with ordinary plastic strips using the above procedure, when the window frame is put through the paint line, the heat of the drying oven tends to cause the plastic to shrink and thus ruin the bond between the plastic and the aluminum. This is overcome, according to the present invention, by adding a small amount of commercial blowing agent to the plastic mix prior to extrusion, and extruding the plastic at a temperature low enough to prevent blowing. The blowing agent is, of course, selected so that it releases its gas at a temperature higher than the extrusion temperature, but lower than the oven temperature. The plastic strip, when it is assembled to the aluminum frame, is quite rigid and strong. However, without the blowing agent, when it is subjected to the normal oven temperature of the painting process, it has a tendency to shrink. The addition of the blowing agent not only counteracts this tendency, but the amount of the blowing agent is so selected as to produce a resultant slight degree of expansion, which results in a tighter bond between the plastic and the aluminum and produces a firm and rigid window frame having the desired insulating properties. Any suitable thermo plastic compound may be used for the plastic extrusion, such as PVC, polypropylene, etc. Common bowing agents commercially available are Celogen, Kempore (which are nitrogen releasing agents), baking soda, or yeast.

As best shown in FIG. 2, it is desirable to provide some relief space in the grooves 11 and 12, to accommodate the enlarged volume of plastic material. This can be provided by enlarged corners as shown at 16 and 17, into which any excess expanded material of the horizontal arms of the plastic strip can expand. Alternatively, the grooves 11a and 12a (FIG. 4) can be made larger than required, so that any excess material in the arms tends to expand horizontally, while maintaining a firm contact with the aluminum material in such a manner as to produce a tight, immovable joint.

In some situations, where it may be desirable to assemble two metal elements 22 and 23 by bringing them together laterally without any further treatment, grooves 24 and 26 may be provided which are not dovetailed, and the plastic strip 25 may be made cruciform in cross-sectional shape and of such dimensions as to provide a snug fit during the assembly and prior to the heat treatment. The original dimensions of the plastic strip 25 are indicated by the dotted lines 27a, 27b, and 28a, and 28b. After the heat treatment, the material expands to the dimensions shown. It will be obvious that the tendency of the plastic material to also increase in thickness will also produce a very firm and rigid bond between the plastic and the metal surfaces which it engages.

FIG. 6 shows the invention applied to an insulated handle 31 which is to be attached to any suitable corresponding element 32 of a utensil subjected to heat, such as a frying pan, cooking pot, etc. The plastic thermo-break 33 is provided, preferably with an external configuration corresponding to that of handle 31, and with two protruding plugs 34 and 36 which are fed into holes 37 and 38 drilled into the respective elements which are to be mated. Preferably the holes are then fluted longitudinally as shown at 39 in FIG. 7. The two elements are assembled with a forced fit prior to heat treatment, and after heat treatment, due to expansion of the plastic element, which contains a blowing agent as described above, a very tight and rigid fit is obtained. The blowing agent is preferably so selected that the temperature of the paint over which is normally employed for the finished utensil will suffice to cause the desired blowing action.

It will be apparent that the embodiments shown are only exemplary and that various modifications can be made in construction and arrangement within the scope of my invention as defined in the appended claims.

I claim:
1. In combination,
   (a) two metal members and a plastic locking element serving to both rigidly connect the two elements mechanically and also to provide a thermal insulating barrier to retard the transmission of heat between the two metal members,
   (b) said plastic locking element having one portion thereof extending into a recessed portion in one of said metal members and another portion thereof, spaced from the first, extending into a recessed portion in the other of said metal members with no portions of the two metal members in direct contact with each other,
   (c) said plastic member containing a small amount of heat-responsive blowing agent, sufficient so that upon heating the plastic to a temperature high enough to activate the blowing agent, the plastic member is expanded sufficiently to firmly engage and lock into said recessed portions to rigidly connect the two metal members to each other.

2. The invention according to claim 1, each of said metal members being an elongated extruded member formed with an elongated locking slot forming said recessed portion, said plastic member being also extruded with two protruding elongated extensions shaped and dimensioned to fit into said slots.

3. Method of forming a rigid unit comprising two spaced-apart heat-conductive metal members and a rigid plastic element tightly interlocked with both members so as to provide both a mechanical connection and a thermal barrier between them, said method comprising the following steps:
   (a) adding to the material of the plastic member a heat-actuated blowing agent,
   (b) forming the plastic to a desired shape, including at least two spaced protruding portions, at a temperature sufficiently low not to activate the blowing agent,
   (c) forming the metal members with respective locking recesses,
   (d) inserting the respective protruding portions of the plastic element into the respective locking recesses in the metal members,
   (e) heating the thus-formed assembly of plastic and metal members to a temperature sufficiently high to activate the blowing agent and expand the plastic into tight and rigid engagement with the two metal members to form a rigid assembled unit.

4. Method as claimed in claim 3, in which the heating is performed at a temperature of between 350° F. and 420° F.

5. Method according to the preceding claim, in which the heating temperature is maintained for at least five minutes.

6. Method according to claim 3, each of said metal members being an elongated extruded member formed with an elongated locking slot, said plastic member being also extruded with two protruding elongated extensions shaped and dimensioned to fit into said slots, said extensions being fitted into said slots prior to said heating step.

References Cited

UNITED STATES PATENTS

| | | | |
|---|---|---|---|
| 1,747,964 | 2/1930 | Wirth | 287—189.36 |
| 3,323,267 | 6/1967 | Fish | 264—45 X |

FOREIGN PATENTS

| | | |
|---|---|---|
| 804,258 | 1958 | Great Britain. |

JOHN E. MURTAGH, *Primary Examiner.*